UNITED STATES PATENT OFFICE.

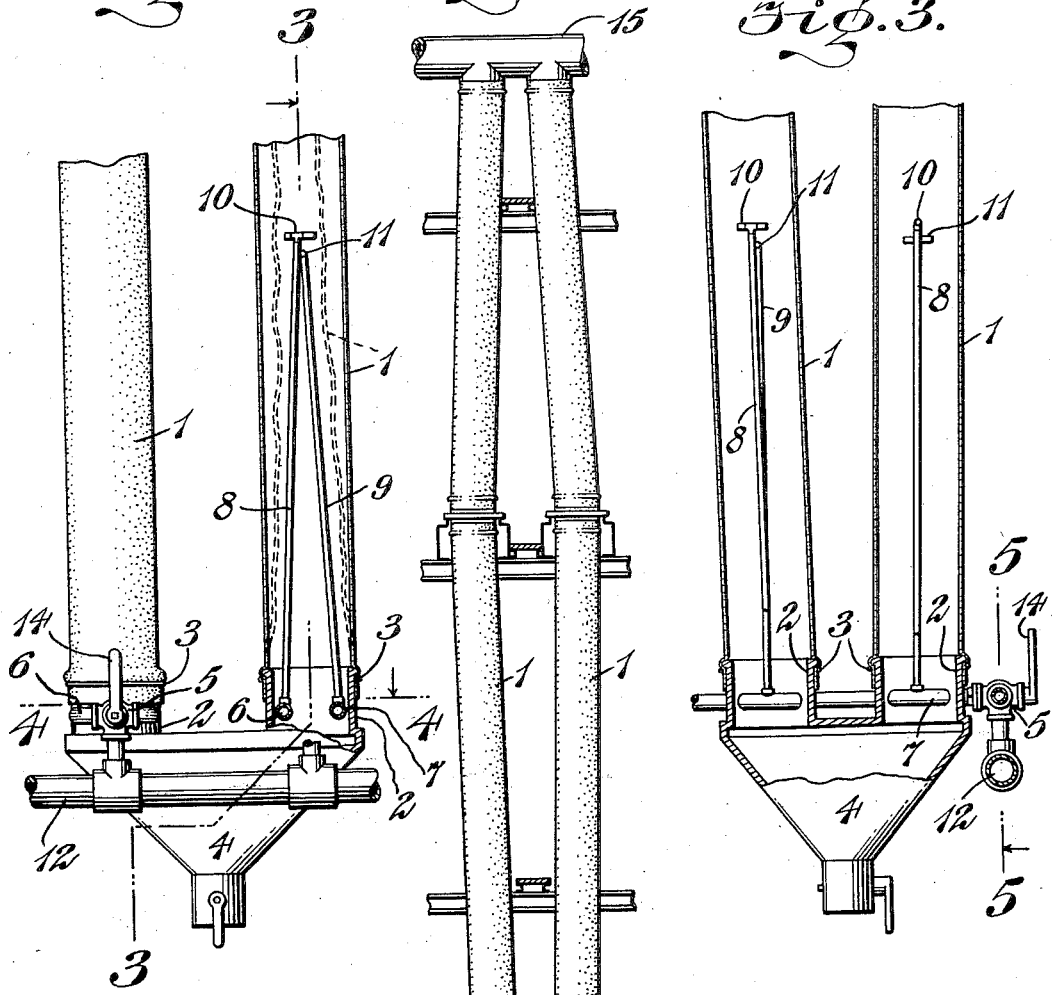

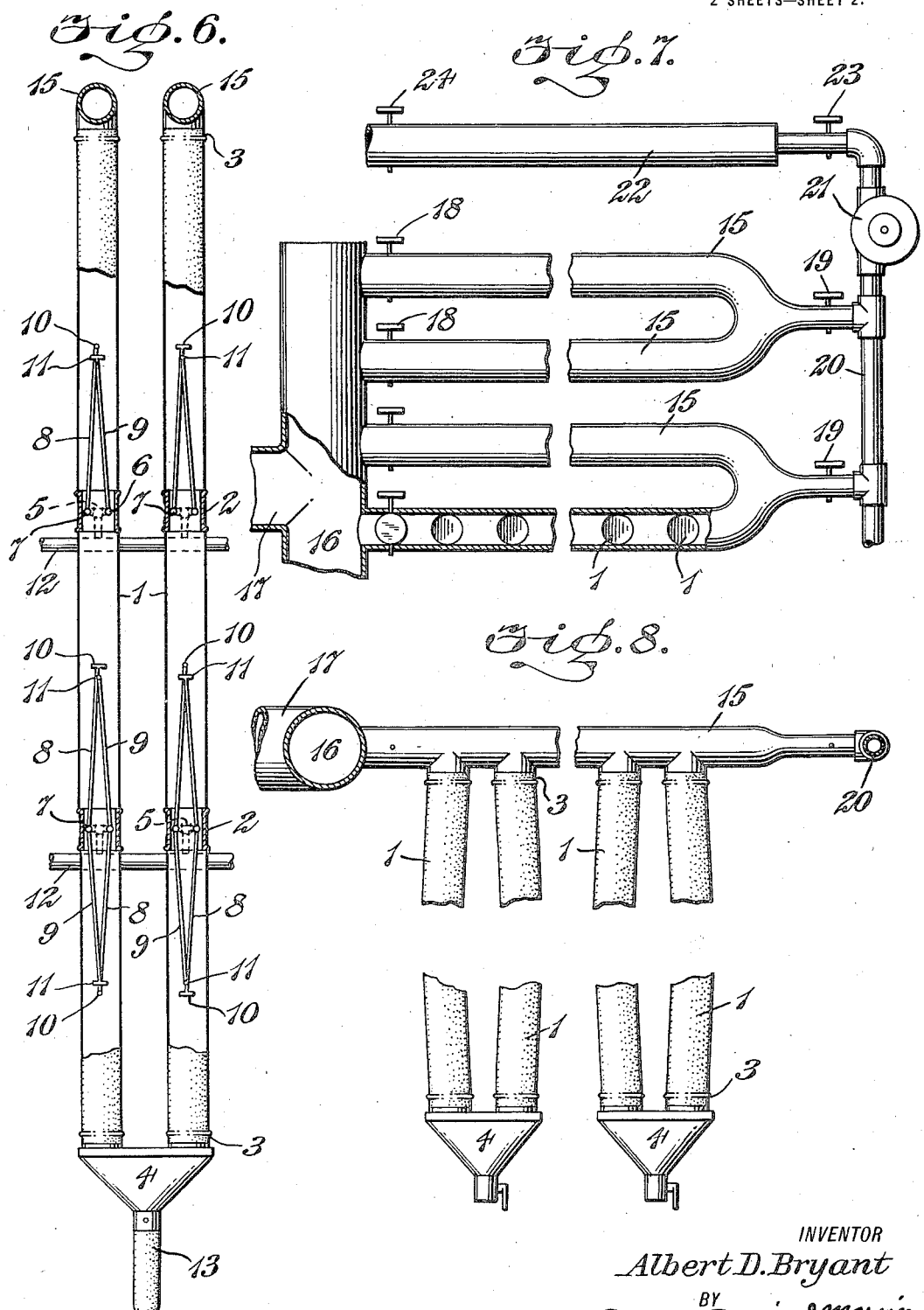

ALBERT D. BRYANT, OF PALMERTON, PENNSYLVANIA, ASSIGNOR TO NEW JERSEY ZINC COMPANY, OF NEW YORK, N. Y., A CORPORATION OF NEW JERSEY.

BAG-SHAKING APPARATUS.

1,163,318.  Specification of Letters Patent.  Patented Dec. 7, 1915.

Application filed August 26, 1915. Serial No. 47,430.

*To all whom it may concern:*

Be it known that I, ALBERT D. BRYANT, a citizen of the United States, residing at and whose post-office address is Palmerton, county of Carbon, Pennsylvania, have invented certain new and useful Improvements in Bag-Shaking Apparatus; and I do hereby declare the following to be a full, clear, and exact description of the invention, such as will enable others skilled in the art to which it appertains to make and use the same.

This invention relates to the shaking of filtering bags by the use of compressed air, in order to remove from the bag fine particles which have collected thereon. Such filtering bags, of muslin or other suitable material, are used for removing fine particles of zinc oxid, cement, flour and other substances from air or other gases containing them. The fine particles are strained or filtered out by the material of the bag and collect on its interior. Thus, in the separation of zinc oxid from smelter fumes, the fine particles of zinc oxid collect on the muslin filter bags so that it is necessary to effect periodic removal.

The present invention relates particularly to the shaking and cleaning of such filter bags and to the separation and removal therefrom of solid particles which have accumulated during the filtering process.

The bag shaking apparatus of the present invention comprises, in combination with the bag and its supports, means within the bag intermediate its supports for discharging blasts of compressed air successively against the bag to impart vibratory movement to the bag. The means for discharging the blasts of compressed air successively against the bag, and thereby vibrating the bag, comprises one or more pipes arranged to discharge blasts of the compressed air either intermittently through the same pipe, or alternately through pipes arranged at an angle to each other.

The invention will be described more particularly in connection with the embodiments thereof illustrated in the accompanying drawings, but it is intended and understood that the invention will be illustrated by, but is not limited to, the specific embodiments thus illustrated and described.

In the accompanying drawings, Figure 1 shows two filter bags in elevation with the bag shaking apparatus of the present invention incorporated therewith; Fig. 2 is an end elevation with parts in section illustrating the invention; Fig. 3 is a sectional view taken on the line 3—3 of Fig. 2; Fig. 4 is a horizontal section taken on the line 4—4 of Fig. 2; Fig. 5 is a detail section taken on the line 5—5 of Fig. 3; Fig. 6 shows, partly in section and partly in elevation, two filtering bags with the invention incorporated therewith; Fig. 7 is a plan, with parts in section, of an arrangement of filtering bags and connections, and Fig. 8 is a side elevation of the apparatus of Fig. 7.

The filtering bag 1, which may be of muslin or other suitable material, is secured to the supporting rings 2 by the strings 3. The lower rings 2 are fixed to the collecting hoppers 4, from which the oxid or other material is discharged into collecting bags 13. The filtering bags with their supports may be of any suitable or preferred construction common in the art. Outside the lower supporting rings 2 of Figs. 1 to 4, and outside the intermediate supporting rings 2 of Fig. 6, is arranged a supply pipe 12 for compressed air or other compressed gaseous fluid. This supply pipe has branches leading to distributing valves 5 which are in turn connected to the distributing pipes 6 and 7 extending through the supporting tubes 2, one on each side. Within each support are arranged two supply tubes 8 and 9 extending from the distributing pipes 6 and 7 and terminating in discharge nozzles 10 and 11 arranged at right angles to each other to discharge the compressed air against opposite sides of the bag.

The distributing valve 5 may be of any suitable or preferred construction for admitting the compressed air from the supply pipe 12 alternately into the distributing pipes 6 and 7 or intermittently into either of the distributing pipes, whereby the blasts of compressed air will be discharged successively against the bag to impart a vibratory movement thereto, either alternately through the separate distributing pipes, or intermittently through either pipe. A common type of three-way valve is illustrated in Fig. 5, but any other form of three-way valve or a combination of two separate disk or puppet valves will operate in the same manner to admit the compressed air alternately into either or both of the distributing pipes, as will be readily understood. Accordingly, I do not limit myself to any particular form of valve or valves for effecting this alternation. The valve shown is provided with a handle 14 by means of which it can be turned alternately in different directions to admit the compressed air first into the pipe 6 and then into the pipe 7, or intermittently into either of these pipes.

The number and arrangement of the compressed air nozzles can be varied according to the length of the pipe and other practical considerations. In Figs. 1 to 4, the supply connections are arranged at the end supporting rings 2 at the bottom of the bags. In Fig. 6 they are arranged at intermediate supporting rings. It will be seen that the supply tubes 8 and 9 are of a sufficient length to extend about one half the distance between the bag supports, so that the nozzles 10 and 11 are arranged intermediate the bag supports where they can exert their maximum shaking action. With bags of the length shown in Figs. 1 to 6, a plurality of shaking devices are usually provided, either at the end supports or at the intermediate supports. The intermediate shaking devices have been omitted in Fig. 1, but are illustrated in detail in Fig. 6. These shaking devices may extend in one direction only, or in both directions from the intermediate supports, as illustrated in Fig. 6. When they extend in both directions from the same support, both shaking devices can be supplied from the same compressed air distributing pipes.

In the operation of the shaking device of the present invention, the handle 14 of the distributing valve 5 is moved to connect the supply pipe 12 alternately with the distributing pipes 6 and 7. This causes a puff or blast of the compressed air to be discharged in opposite directions alternately through the nozzles 10 and 11. These blasts of air, accordingly, strike the bag on opposite sides, and then on opposite sides at right angles, so that the bag is drawn in and out by the air currents. The valve is quickly turned so that only a momentary impulse is obtained and the compressed air is alternately shut on and off so that it is discharged alternately at right angles. By operating the valve at the proper speed and with air at suitable pressure, the bag is effectively shaken and the oxid or solid material thus removed therefrom.

In Figs. 7 and 8 is shown an arrangement of filtering bags with intake and outlet connections. The filtering bags depend from top branch pipes 15 which connect with the main supply header or manifold 16 into which the zinc oxid fumes or other gases to be treated are introduced through the supply pipe 17. Dampers 18 are provided for controlling the admission of the air or gases to the branch pipes 15, and dampers 19 are also provided for controlling the exhaust pipes leading from these branch pipes to the outlet pipe 20. An exhaust fan 21 is provided in the outlet pipe 20, and a branch header 22 is also provided of a construction similar to that of the branch pipes 15, dampers 23 and 24 being provided for controlling this branch header.

The filtering of smelter fumes takes place under a sufficient pressure to keep the filter bags distended. This pressure tends to hold the solid particles against the inside of the bag and prevent their removal by shaking. Also, with the bags tightly stretched, shaking is often difficult. In order to relieve the pressure from the inside of the bags so that the bags may hang loose and so that the bags may be more effectively shaken, means may with advantage be provided for drawing out the compressed air or gases from inside the bags. This is provided for in the arrangement of Figs. 7 and 8. When it is desired to shake the bags, the dampers 18 of two of the branch pipes 15 are closed, the corresponding damper 19 is opened, and the fan 21 started to draw the gases from the filtering bags and discharge them into the branch header 22 and the filter bags attached thereto. The bags will now hang loose, due to the exhaustion of the gas therefrom and may be easily shaken in the manner already described. During the shaking operation a certain amount of air is introduced into the bags by the shaker as well as by leakage past the dampers 18. Should this amount of air become too great, it can be withdrawn by slightly opening the exhaust damper 19. Any solid particles which are drawn off by the fan 21 will be collected in the filter bags suspended from the branch header 22.

The air admitted by the shaker is not sufficient in amount to force the oxid from the bag, but only sufficient to cause the desired shaking. As distinguished from mechanical shaking which acts positively against the material of the bag, the shaking by compressed air according to the present invention has the advantage that the puffs or blasts of air are of an elastic and yielding nature so that the oxid or other material is readily loosened. The oxid drops into the hoppers at the bottoms of the bags and is collected in the bags 13.

It will be obvious that instead of using compressed air other compressed gas can be used in a similar manner, and it will also be readily understood that the gas which is filtered may be either air or smelter fumes or other gaseous fluid containing fine particles of suspended matter. Accordingly, I consider the use of other compressed gases as equivalent to the use of compressed air in the bag shaking apparatus of the present invention. Where a non-oxidizing atmosphere is desired, it will be understood that the compressed gas may be of a non-oxidizing nature.

What I claim is:

1. A bag shaking apparatus comprising, in combination with the bag and its supports, means within the bag intermediate its supports for discharging blasts of compressed air alternately against the bag at an angle to each other; substantially as described.

2. A bag shaking apparatus comprising, in combination with the bag and its supports, means within the bag intermediate its supports for discharging two blasts of compressed air against opposite sides of the bag at right angles to each other, and means for alternating the discharge of said blasts; substantially as described.

3. A bag shaking apparatus comprising two nozzles at right angles to each other arranged within the bag intermediate its supports, supply tubes for leading compressed air to said nozzles, and means for introducing the compressed air alternately to said tubes and nozzles; substantially as described.

4. A bag shaking apparatus comprising two nozzles at right angles to each other arranged within the bag intermediate its supports, two supply tubes within the bags extending from one of the bag supports to said nozzles, and valve means outside the bag support for introducing the compressed air alternately to said tubes and nozzles.

5. A bag shaking apparatus comprising, in combination with the bag and its supports, means for exhausting the air or gas from the bag and means within the bag intermediate its supports for discharging blasts of compressed air alternately against the bag at an angle to each other; substantially as described.

6. A bag shaking apparatus comprising, in combination with the bag and end and intermediate supports therefor, supply tubes for compressed air extending from one or more of said intermediate supports and terminating intermediate the supports in discharge nozzles arranged to discharge blasts of compressed air against opposite sides of the bag at right angles to each other, and means for introducing the compressed air alternately to said tubes and nozzles; substantially as described.

7. A bag shaking apparatus comprising, in combination with the bag and end and intermediate supports therefor, supply tubes for compressed air extending in both directions from one or more of said intermediate supports and terminating intermediate the supports in discharge nozzles arranged to discharge blasts of compressed air against the opposite sides of the bag at right angles to each other, and means for introducing the compressed air alternately to said tubes and nozzles; substantially as described.

8. A bag shaking apparatus comprising, in combination with a series of bags and their supports, two nozzles within the bags intermediate their supports at right angles to each other, two supply tubes for compressed air leading to said nozzles from the bag supports, common supply pipes for supplying compressed air to the supply tubes of the series of bags, and means for introducing the compressed air alternately into said common supply pipes, tubes and nozzles; substantially as described.

9. A bag shaking apparatus comprising in combination with the bag and its supports, means within the bag intermediate its supports for discharging blasts of compressed air successively against the bag to impart a vibratory movement to the bag; substantially as described.

10. A bag shaking apparatus comprising in combination with the bag and its supports, means for exhausting the air or gas from the bag, and means within the bag intermediate its supports for discharging blasts of compressed air successively against the bag to impart a vibratory movement to the bag; substantially as described.

In testimony whereof I affix my signature.

ALBERT D. BRYANT.